United States Patent [19]

Chapman et al.

[11] Patent Number: 4,775,995

[45] Date of Patent: Oct. 4, 1988

[54] ADAPTIVE SPLATTER CONTROL

[75] Inventors: Ronald H. Chapman, Wheaton, Ill.; John S. Ruppel, North Richland Hills, Tex.; Anthony P. van den Heuvel, Arlington Heights; Jona Cohn, Morton Grove, both of Ill.

[73] Assignee: Motorola, Inc., Schaumburg, Ill.

[21] Appl. No.: 945,041

[22] Filed: Dec. 22, 1986

[51] Int. Cl.⁴ .............................................. H01Q 7/04
[52] U.S. Cl. ..................................... 379/58; 455/110; 455/54; 379/63
[58] Field of Search .................... 381/13, 16; 455/110, 455/63, 54, 69, 70, 71, 42; 379/56, 58, 63; 370/110.1; 357/44

[56] References Cited

U.S. PATENT DOCUMENTS

| | | | |
|---|---|---|---|
| 2,579,882 | 12/1951 | Thompson | 455/23 |
| 2,678,998 | 5/1954 | Young, Jr. . | |
| 3,626,311 | 12/1971 | Kraybill . | |
| 3,626,331 | 12/1971 | Burns . | |
| 3,732,496 | 9/1973 | Boyer . | |
| 3,810,018 | 5/1974 | Stover | 455/42 |
| 3,916,344 | 10/1975 | Enderby . | |
| 3,962,639 | 6/1970 | Kebmode | 455/42 |
| 3,984,776 | 10/1976 | Stedman . | |
| 4,019,138 | 4/1977 | Watanabe | 455/69 |
| 4,034,299 | 7/1977 | Cho et al. . | |
| 4,373,115 | 2/1983 | Kahn | 381/16 |
| 4,457,020 | 6/1984 | King | 455/70 |
| 4,491,972 | 1/1985 | Weber . | |
| 4,580,262 | 4/1986 | Naylor | 371/5 |
| 4,581,749 | 4/1986 | Carney et al. . | |
| 4,613,990 | 9/1986 | Halpern | 455/33 |
| 4,639,145 | 1/1987 | Winters . | |
| 4,646,082 | 6/1987 | Paneth et al. . | |

FOREIGN PATENT DOCUMENTS

| | | | |
|---|---|---|---|
| 0122246 | 9/1981 | Japan | 455/69 |
| 0218932 | 11/1988 | Japan | 455/69 |
| 1075371 | 1/1984 | U.S.S.R. | 455/69 |

Primary Examiner—Robert Lev
Attorney, Agent, or Firm—Charles L. Warren; Steven G. Parmelee; Ronald G. Wesoloski

[57] ABSTRACT

An improved arrangement and method for use in a radio communication system is disclosed which makes possible mobile radio channel assignments on narrower channel spacings with a minimum amount of adjacent channel interference or splatter occurring at an included base station receiver. In a first embodiment, the mobile radios modify at least one transmission parameter, such as maximum allowable deviation, a given amount of transmitter output power, and a modulation limiting bandwidth, if a processed value of receive signal strength exceeds at least one predetermined threshold value. The processed value of receive signal strength is taken from a plurality of sampled and stored receive signal strength values in the mobile radio. By determining that the processed value of receive signal strength exceeds a predetermined threshold value, the mobile radio is able to adaptively control the amount of splatter caused at the base station, thus keeping the amount of splatter within acceptable levels.

In a second embodiment, the improved arrangement and method incorporated in a mobile radio progressively adapts the transmission parameters upon determining that the processed value of receive signal strength exceeds a first, a second, and a third threshold value to effect reduced maximum allowable deviation only, reduce the maximum allowable deviation and power output only, or to reduce the maximum allowable deviation, power output, and modulation limiting bandwidth upon exceeding one, two, or all of these threshold values.

Moreover, in each of these embodiments, the base station includes apparatus and a method for compensating the level and bandwidth of recovered audio by sensing the relative level of received signal strength in the base station receiver.

51 Claims, 7 Drawing Sheets

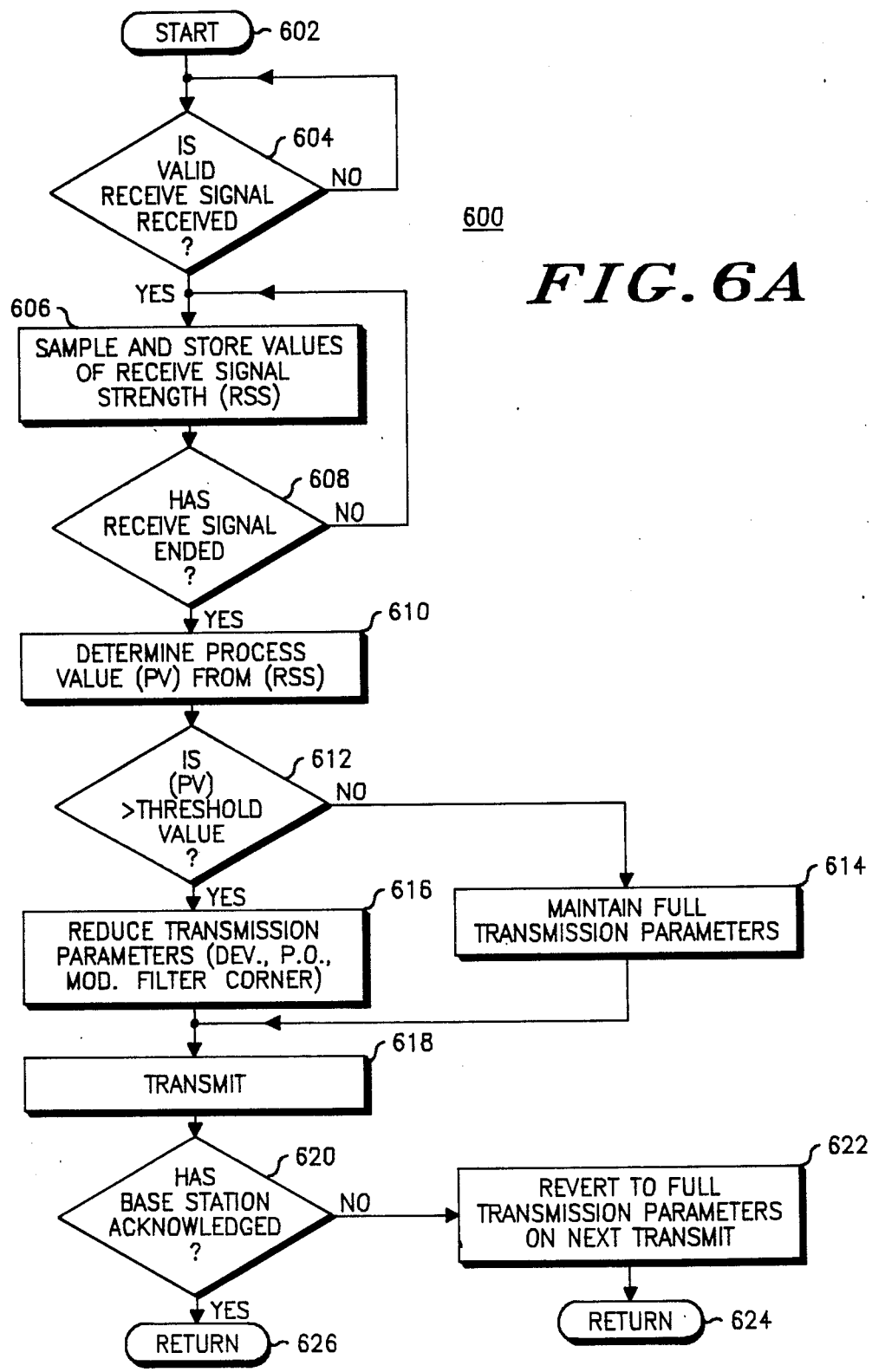

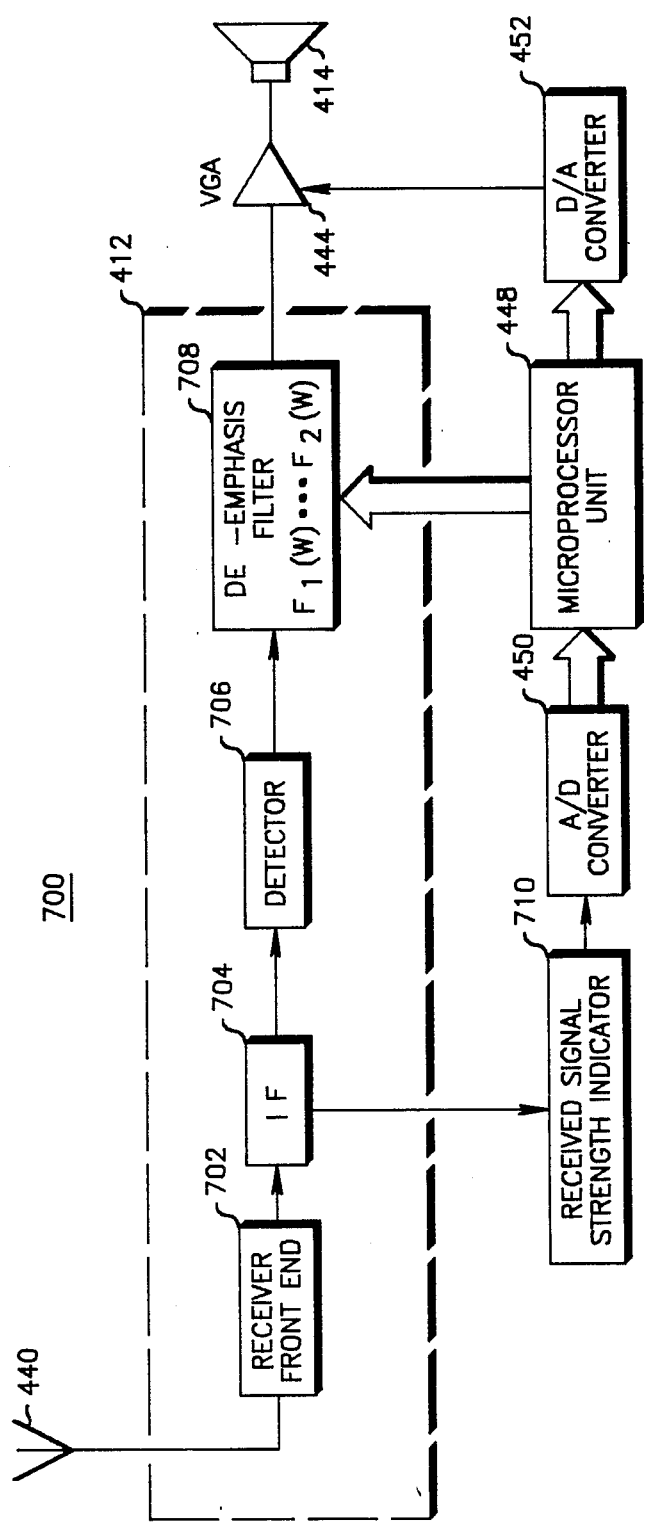

ADAPTIVE SPLATTER CONTROL

BACKGROUND OF THE INVENTION

The present invention relates generally to control of interference in land mobile FM radio communication systems and, more specifically, to an arrangement and method for controlling adjacent channel interference, or splatter, caused by frequency or phase modulating a transmitter with analog and/or digital data and which is useful in narrow-band land mobile FM radio systems.

Today's communication systems require efficient use of the crowded radio spectrum, especially in congested metropolitan areas. Typically, the channels available for land mobile communications are spaced 25 KHz or 30 KHz apart in the UHF band such that transmissions from one transmitter do not interfere with the transmissions of a transmitter on an adjacent channel. Generally, frequency (or phase) modulation is used on these channels to convey analog information, such as voice, from a transmitter to a receiver. It is also desirable to transmit data over some of these channels, usually referred to as control channels. However, when information signals are modulated onto a radio frequency (RF) carrier, a wide radio spectrum can be generated. This wide spectrum overlaps or splatters energy into adjacent channels and can result in poor system senitivity for a receiver tuned to an adjacent channel. Therefore, in order to avoid splatter, it is the task of an included audio filter and limiter to constrain the amplitude and frequency of the modulating signal such that an RF carrier so modulated produces modulation energy in the adjacent channels which is at least 55–60 dB below the level of the carrier. Most mobile radios provide better than 55–60 dB of splatter protection for conventional channel spacings. However, to achieve more efficient use of the limited radio spectrum available for land mobile communications, modern communication systems are demanding narrower channel spacings, such as 12.5 KHz. Therefore, it is evident that additional protection against splatter (or adjacent channel interference) is required to ensure that energy at the channel edges is kept below an acceptable level.

In any event, certain general techniques have been developed which singularly address these individual constraints by providing apparatus for solving one particular problem.

One known improvement utilizes a data frequency modulator with deviation control to level the amount of deviation of modulated data by utilizing a feedback loop to increase or decrease the deviation such that the residual modulation is minimized. However, this known arrangement is directed to an angle modulator for a transmitter in a radio which modulates the radio carrier or a precursor of the radio carrier to a deviation amount proportional to the data input level. This deviation amount is compared to a predetermined positive deviation frequency value when the input data bit is at one binary level and is compared to a predetermined negative deviation frequency value when the data bit is at the second binary level, thus revealing differences in the carrier deviation amount and a predetermined positive or negative deviation value when the data bit is at a "one" or a "zero" level.

A second known arrangement utilizes an improved radio transmitter modulation control circuit which increases the average power of the modulating signal, resulting in an enhanced audio signal quality since the signal-to-noise ratio is likewise increased. The improved modulation control circuitry consists of an operational amplifier having a phase-lag filter which operated in either of two modes, namely a linear mode, and an amplitude limiting mode. The amplitude limiting mode alters the phase and amplitude of harmonic signals from the operational amplifier to reduce the maximum peak-to-peak output signal to an acceptable level before applying this signal to the splatter filter. This second known arrangement permits a 2.1 dB improvement in average modulating signal power when utilized in FM radio having a maximum deviation of 5,000 Hz, and assumes a fixed width for its channel assignment. Thus, each of these arrangements addresses how to best utilize a fixed width for a channel assignment which merely attempts to best utilize the fixed channel assignment by maximizing the modulation information. Thus, the first arrangement addresses the modulation sensitivity instability problem, and the second known arrangement addresses how to enhance audio signal quality by providing a 2.1 dB improvement in average modulating signal power. Furthermore, while each of these known arrangements is useful in and of themselves, none of the above known arrangements makes use of information regarding the quality of the communications link, such that modulation parameters can be cut back during strong signal conditions when high communications link quality exists and the possibility of interfering with adjacent channel users exists.

Accordingly, there exists a need for an improved method and arrangement for adaptively controlling modulation parameters in an angle modulated transmitter of a mobile radio when operating in a system having significantly reduced channel widths and which takes into account communications link quality so that adjacent channel interference (or splatter) at the system's base station can be minimized. Furthermore, there exists a need to provide the above mentioned capability in a programmable fashion, such that the degree of cut back, or adaptive control, can be tailored to the needs of a particular communication system, whether operating at UHF or VHF frequencies.

SUMMARY OF THE INVENTION

It is an object of the present invention to provide an improved method and arrangement for adaptively controlling the amount of adjacent channel interference, or splatter, caused by a mobile radio deviating an RF carrier in an angle modulated transmitter having its modulation parameters controlled by the signal strength of signals received at the mobile radio such that the mobile radio operates in a manner that effectively provides the same amount of splatter performance as in wide channel bandwidth systems and which overcomes the foregoing deficiencies.

It is a further object of the present invention to provide an improved method and arrangement for adaptively controlling the modulation parameters in a mobile radio transmitter of the foregoing type which has preprogrammed capability and progressive stepped control of the modulation parameters so that the mobile radio is able to adapt to changing radio propagation conditions while providing a comparable amount of effective splatter protection for the base station radio.

In practicing one form of the invention, each of the mobile radios is responsive to a single threshold level which, when exceeded by the received signal strength, modifies at least one transmission parameter, including decreasing the maximum allowable deviation by a preset amount, reducing the given amount of transmitter output power, and narrowing the bandwidth of an included modulation bandwidth limiting filter by decreasing an upper frequency corner. In practicing a second form of the invention, the method is altered to include a plurality of progressively higher fixed threshold levels, such as a first, a second, and a third threshold level, which, when exceeded by the received signal strength in the mobile radio, modifies the transmission parameters by decreasing the maximum allowable deviation by a preset amount only upon exceeding the first threshold level, reducing the amount of transmitter output power only upon exceeding the second threshold level, and finally narrowing the bandwidth of an included modulation limiting filter by decreasing an upper frequency corner only upon exceeding the third threshold level. These and other objects of the present invention will become apparent to those skilled in the art upon consideration of the accompanying specification, claims, and drawings.

BRIEF DESCRIPTION OF THE DRAWINGS

Referring to the drawings, wherein like reference numerals indicate like elements in the several figures and in which:

FIG. 6a is a flowchart representative of the method according to the first aspect of the present invention.

FIG. 7 is a more detailed block diagram of the receiver within the base station.

DETAILED DESCRIPTION OF THE PREFERRED EMBODIMENT

Figure 1:
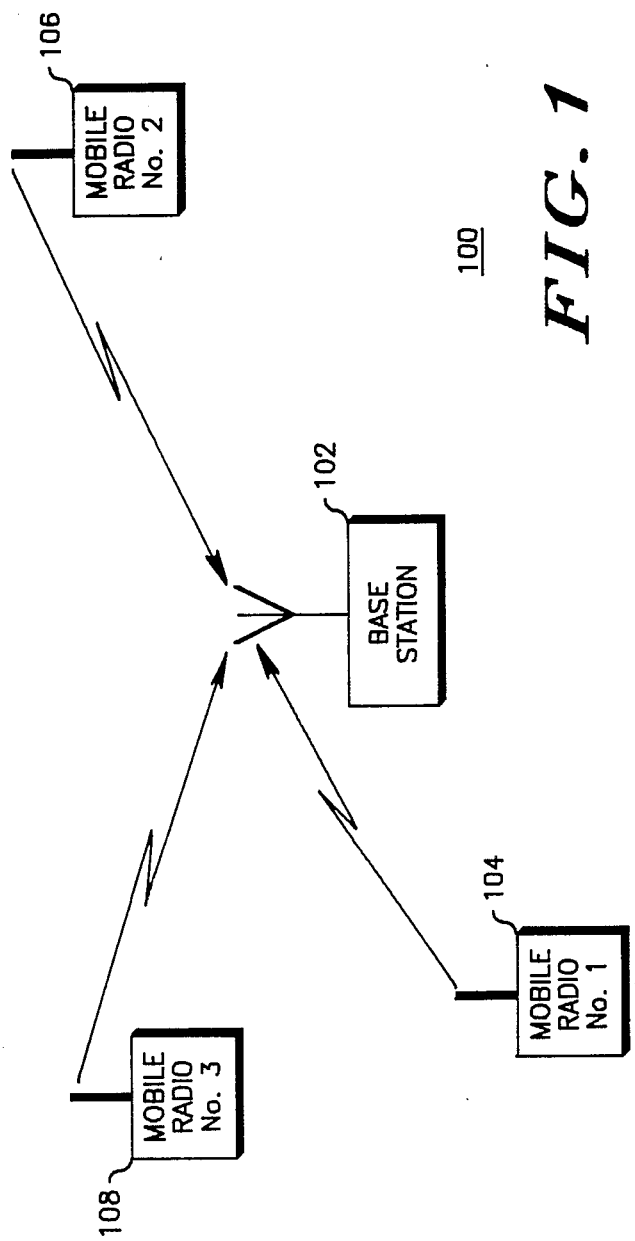
FIG. 1 is a block diagram of a radio communication system having a base station and a group of mobile radios.

Referring now to the drawings, a basic radio communication system arrangement 100 is shown in FIG. 1 which includes a base station 102, and a group of mobile radios. Mobile radio 104, here designated #1, is depicted as the closest mobile radio to base station 102. Another mobile radio 106, here designated #2, is shown farther away from base station 102 than mobile radio #1, but closer than a third mobile radio 108, here designated mobile radio #3.

Figure 2:
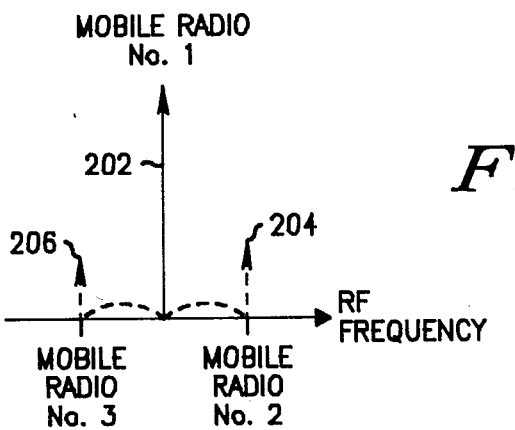
FIG. 2 is a simplified frequency spectral diagram of the angle modulated signal from mobile radio #1 indicating how splatter, or energy on the two adjacent channels, can cause interference at the base station radio particularly when attempting to receive signals from mobile radio #2 and mobile radio #3.

Turning now to FIG. 2, a simplified frequency spectral diagram is shown for mobile radio #1 having on channel output components 202, and energy components falling onto each of the adjacent channels 204, 206 which, at this instant in time, are tuned for receiving mobile radio #2 and mobile radio #3 respectively. This frequency spectral diagram is simplified in that it shows only one set of possible signal level relationships for a given instant in time. The energy levels of each of interfering signals 204 and 206 are determined by well known Bessel functions of the first kind which are a function of the modulation index, Beta, as described in fuller detail on pages 21-6 through 21-10 of "Reference Data for Radio Engineers", 5th Edition, Howard W. Sams & Company, 1972.

Figure 3A:
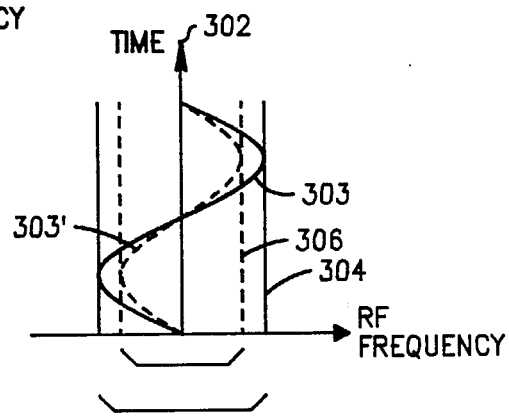
FIG. 3a is a frequency spectral diagram indicative of the result of decreasing the maximum allowable deviation by a preset amount.
Figure 3B:
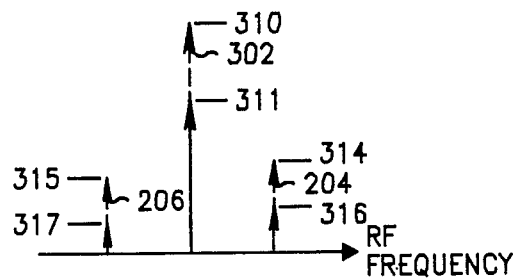
FIG. 3b is a simplified frequency spectral diagram similar to FIG. 2 and indicative of the result of reducing the amount of transmitter output power by a factor less than unity which provides a similar reduction in the energy on the adjacent channels as shown.
Figure 3C:
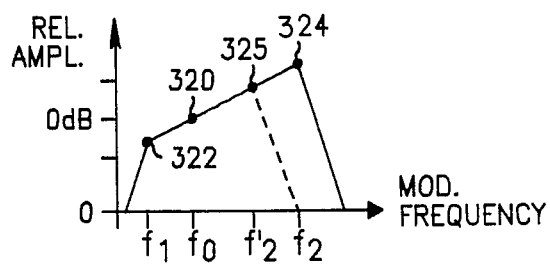
FIG. 3c is a frequency response diagram, or Bode plot indicative of the result of narrowing the bandwidth of an included modulation limiting filter by decreasing the upper frequency corner.

Referring now to FIG. 3a, 3b, and 3c, three aspects forming a set of transmission parameters for an angle modulated transmitter are shown, including a maximum allowable deviation at FIG. 3a, a given amount of transmitter output power in FIG. 3b, and a modulation limiting bandwidth in FIG. 3c. First, according to FIG. 3a, a frequency modulated (FM) transmitter has a carrier signal with center frequency 302 (modulated by sinusoidal waveform 303) to have a nominal level of peak frequency deviation, as represented at 304. This FM transmitter also has capability for a reduced level of maximum allowable peak deviation 306, due to reduced sinusoidal waveform 303'. By so doing, the adjacent channel splatter protection can be improved 3 dB for every 1 dB of reduced deviation. Second, FIG. 3b depicts a simplified frequency spectral diagram similar to FIG. 2, in which the transmitter of the present invention has control over a given amount of transmitter output power. As shown, transmitter carrier 302 having a nominal amount of output power 310 is able to be reduced to a lower amount of output power 311. And, assuming FIG. 3b represents mobile radio #1 from FIG. 2, then the corresponding adjacent channel interfering signals 204 and 206, having nominal levels 314 and 315, respectively, are reduced 1 dB for each 1 dB reduction in output power in proportionally the same manner to levels 316 and 317, respectively, as shown. Third, FIG. 3c depicts a Bode plot of a modulation limiting bandwidth typically used with an angle modulated transmitter, such as an FM communications transmitter. As shown, the frequency response of this modulation limiting bandwidth generally has a reference point 320 having a relative amplitude response of zero dB at a specified frequency $f_0$, usually 1 KHz. Although shown in somewhat idealized form, there is usually included a lower corner frequency 322, corresponding to $f_1$, and an upper corner 324, corresponding to frequency $f_2$. According to the present invention, control is also provided to effectively pull in corner 324 to a modified upper corner 325, corresponding to frequency $f_2'$. For $f_2=3$ KHz, and $f_2'$ equal to 2.5 KHz, approximately 5 dB of improvement in splatter protection results. As will be seen in the following drawings, any or all of the transmission parameters, represented by FIGS. 3a, 3b, and 3c, will be adaptively controlled in a mobile radio transmitter according to the present invention to effect reduced splatter, or adjacent channel interference, at the base station in the system. When all three are invoked, the total improvement in splatter protection is as shown:

| (a.) | reduced deviation (2.0 vs. 2.5KHz) = | 5 dB; |
|---|---|---|
| (b.) | reduced power output (¼ rated) = | 3 dB; |
| (c.) | reduced mod. bandwidth (2.5 vs. 3KHz) = | 5 dB. |
| | | 13 dB |

Figure 4:
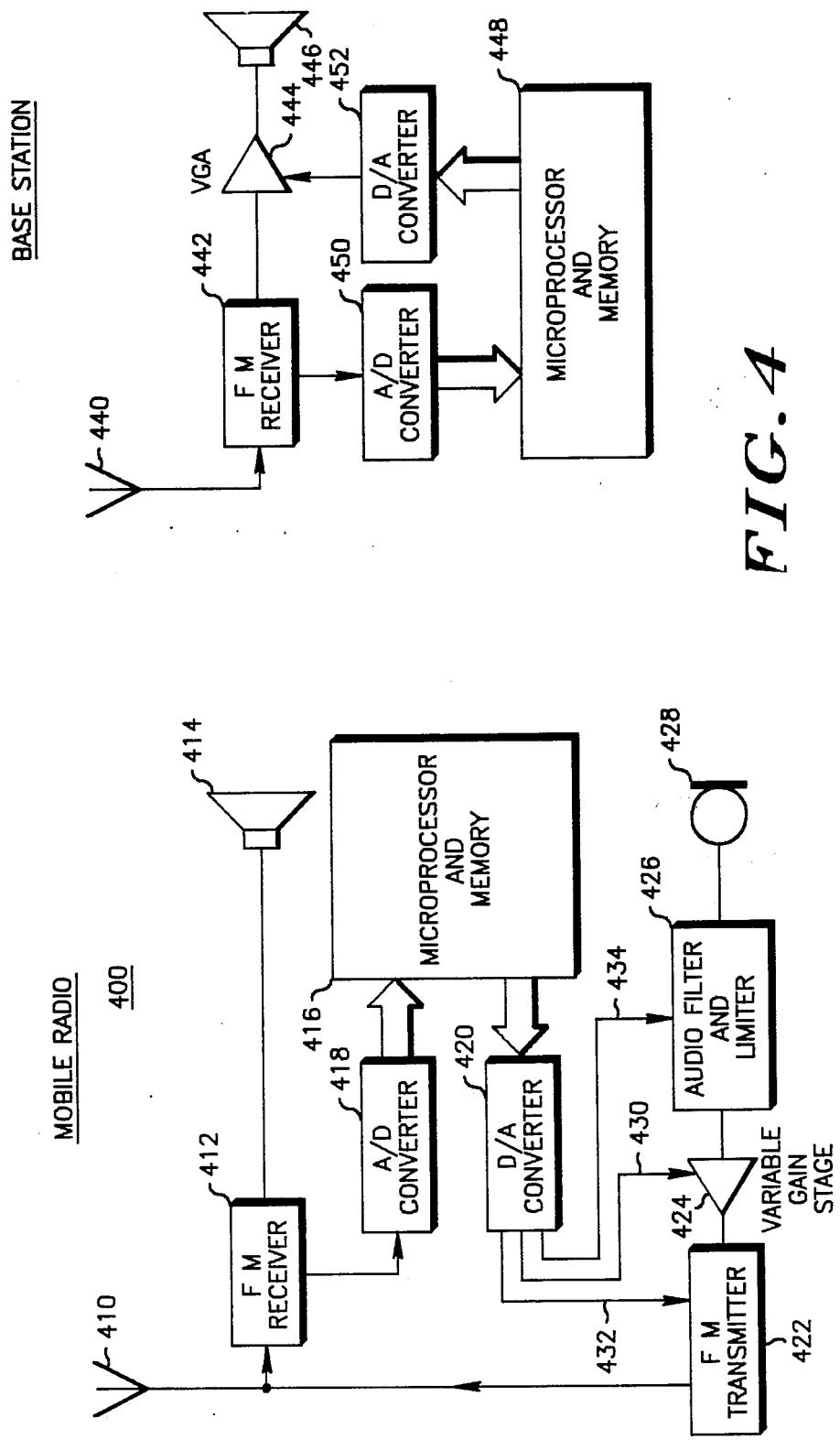
FIG. 4 is a simplified block diagram of each of the mobile radios as well as the receiver portion of the base station depicted in FIG. 1.

Turning now to FIG. 4, block diagrams for a mobile radio and a base station are shown at 400. Beginning with the mobile radio, there is an included antenna 410, which is coupled to FM receiver 412 and speaker 414. A microcontroller is shown having a microprocessor and memory 416 which couples to FM receiver 412 via an analog to digital (A/D) converter 418. The output of microcontroller 416 couples to digital to analog (D/A) converter 420, which couples to an included FM transmitter 422, a variable gain stage 424, and audio filter and limiter stage 426. An included microphone 428 couples to audio filter 426 as shown, and the output of FM transmitter 422 couples to antenna 410. Each of the lines from D/A converter 420 provide adaptive control of the FM transmitter in a mobile radio according to the transmission parameters represented in FIGS. 3a, 3b, and 3c. Thus, line 430 provides control of the maximum allowable peak frequency deviation, line 432 provides control of the given amount of transmitter output power, and line 434 provides control for reducing the modulation limiting bandwidth. Any of these three control lines could also be implemented with digital control signals without D/A converter 420. The base station includes antenna 440 coupled to FM receiver 442, as shown. Complementing what occurs in the mobile radio the base station FM receiver 442 has an output which couples to variable gain amplifier 444 which, in turn, couples to speaker 446. Included within the base station is microcontroller 448, having a microprocessor and memory, which includes an input port having an analog to digital (A/D) converter 450, and which receives a level of signal strength from FM receiver 442. Microcontroller 448 also has an output port including a digital to analog (D/A) converter 452 which provides a control signal to change the level of audio gain in variable gain amplifier 444. This arrangement in the base station then allows the FM receiver to adaptively change its level of audio gain in response to a level of received signal strength within FM receiver 442, and is able to compensate for the loss in the recovered audio level if a mobile radio operating in very close range transmits with reduced deviation.

Figure 5:
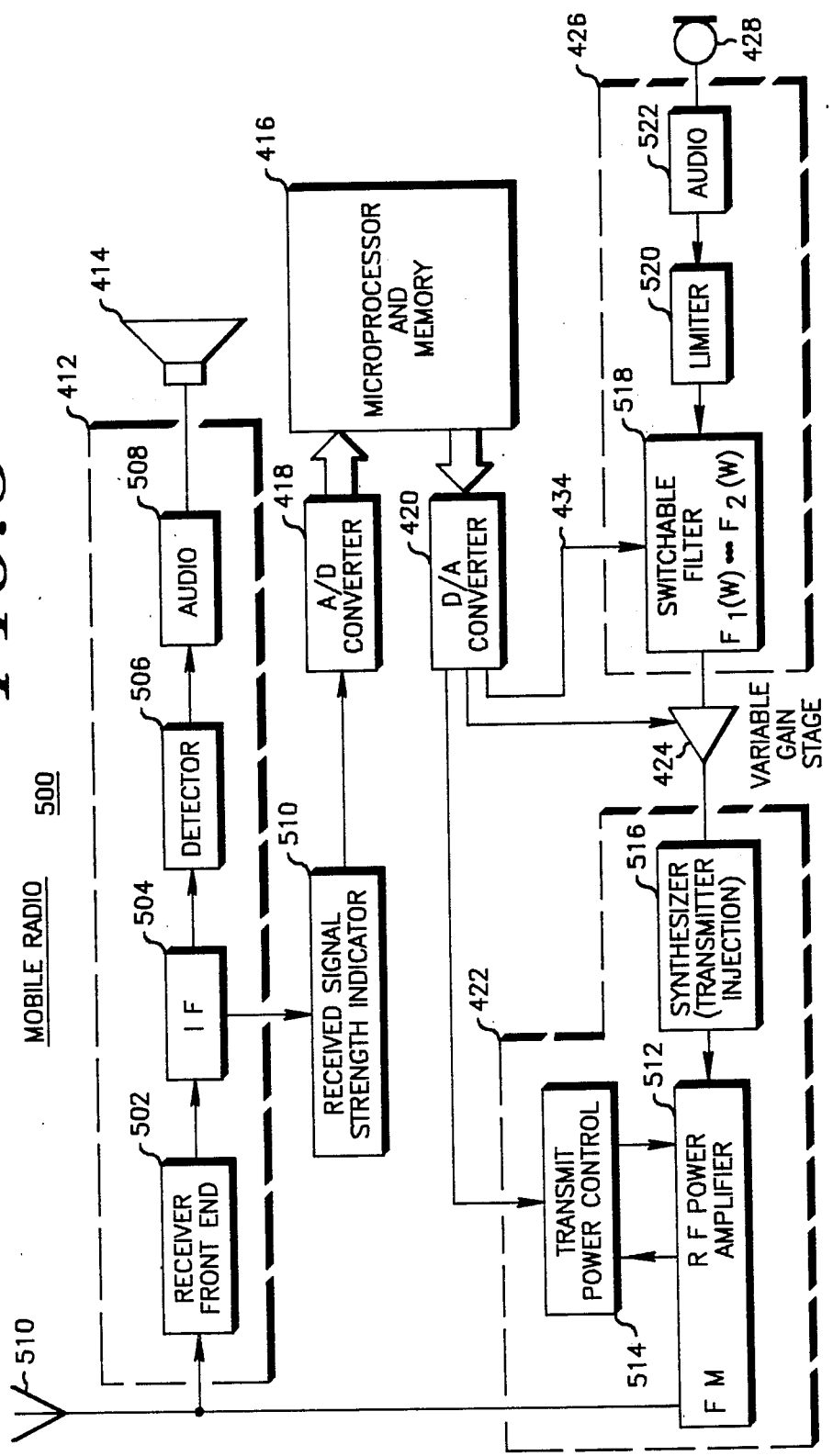
FIG. 5 is a more detailed block diagram of the preferred embodiment of a mobile radio according to the present invention.

Turning now to FIG. 5, a more detailed block diagram of the mobile radio is shown at 500. Starting from antenna 410, FM receiver 412 includes receiver front end 502, IF stage 504, detector 506, and audio stage 508. Also exiting IF stage 504 is a port which couples to receive signal strength indicator 510 which provides an increasing signal (preferrably logarithmic) related to the intensity of the received carrier within IF stage 504. Receive signal strength indicator 510 may be implemented as a separate stage, as shown, or may be included as part of IF stage 504. This level of receive signal strength couples to (A/D) converter 418, as previously shown in FIG. 4. FM transmitter 422 is depicted as having FM RF power amplifier 512, transmit power control stage 514, and having a transmitter injection stage, such as synthesizer 516. Variable gain stage 424 is shown coupled to synthesizer 516, and receives its input signal from audio filter and limiter stage 426 having switchable filter 518, limiter stage 520, and audio amplifier stage 522, as shown. In operation, mobile radio 500 receives an incoming signal via antenna 410 through FM receiver 412 and processes the signal to provide an audio output at speaker 414 and also to provide a level of receive signal strength to A/D converter 418 which is coupled to an input port of microcontroller 416. Upon sensing that the received signal strength exceeds one or more predetermined threshold levels stored in memory, such as an EEPROM within microcontroller 416, an output command is sent to D/A converter 420 which effects one or more modifications to the transmission parameters of the included FM transmitter, via control line 430 for changing the maximum allowable deviation, line 432 for controlling a given amount of transmitter output power, and via line 434 for modifying the modulation limiting bandwidth of the mobile radio transmitter.

Turning now to FIG. 6a, a flowchart representing the steps of the method utilized by microcontroller 416 is given at 600. The routine starts, as represented by block 602, by first considering whether a valid received signal is received, as depicted at 604. If a valid received signal is not sensed, the method continues to check, via a NO path, as shown. If a valid signal is received, however, the method proceeds via YES path to sample and store values of receive signal strength (RSS), as represented at 606. The method next determines whether the receive signal has ended, as represented at block 608. If the receive signal has not ended, the method continues to sample and store values of receive signal strength via NO path, as shown. However, if the method has determined that the receive signal has ended, via YES path, it next determines a processed value (PV) from the receive signal strength (RSS), as represented at block 610. This processed value may include a maximum of the sampled and stored values of stored receive signal strength taken earlier, or may include an average value of the sampled and stored values of receive signal strength, depending upon the particular characteristics of the radio communication system to be served. In the exemplary embodiment, the method utilizes the maximum, or peak, stored value as the processed value, and this choice of processed value is well suited for the UHF radio communication system of the exemplary embodiment. Continuing with this processed value, the method next checks to see if the PV exceeds at least one threshold value, as represented at block 612. Assuming reciprocity of propagation and equal receiver sensitivity, a typical threshold value will be approximately 55 dB above receiver sensitivity (+/−10 dB). If the processed value does not exceed the threshold value, via NO path, the method maintains the full transmission parameters of the FM transmitter, as represented at block 614, and continues onward from there. However, if the processed value does exceed the threshold value, the method proceeds to reduce the transmission parameters, such as maximum allowable deviation, power output (P.O.), and modulation filter corner, as represented at block 616, thus providing 13 dB of splatter protection improvement, for a total 68 dB of splatter protection. Next, the method permits the transmitter to operate according to the transmission parameters established after the processed value was compared against the threshold value, as represented at block 612, and determined in either of block 614 or 616. During or after the transmit mode, the method checks to see if the base station has acknowledged, as represented at block 620. If there is no acknowledgment from the base station, then the method in the mobile radio reverts to full transmission parameters on the next transmit mode, via NO path, as represented at block 622, so that the base station has a second opportunity to hear the mobile radio. Then the method permits the microcontroller to return to other tasks, as represented at block 624. If the base station has acknowledged the mobile radio transmission, then the method permits the microcontroller to return to normal tasks, as represented at block 626.

Figure 6B:
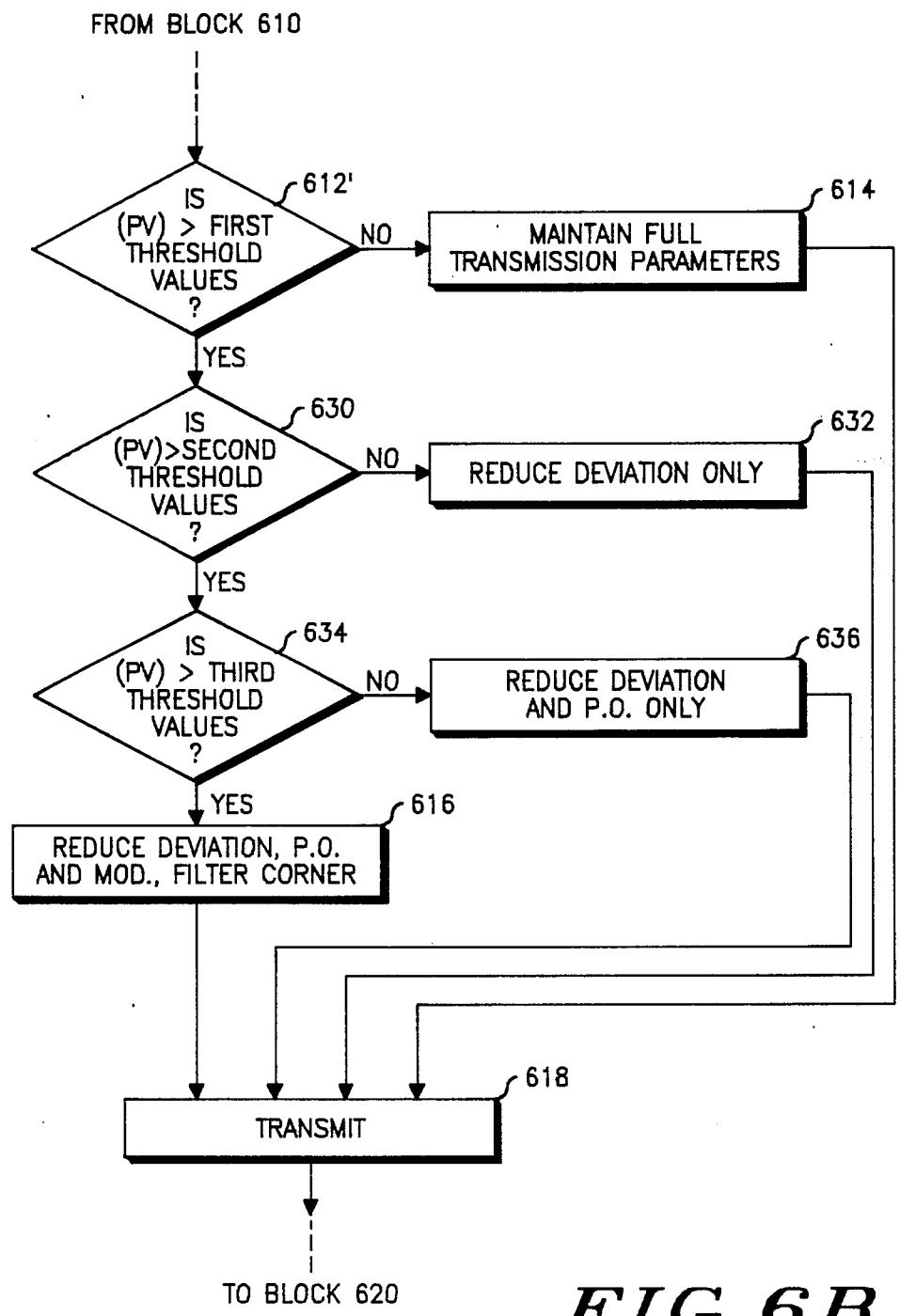
FIG. 6b is a partial flowchart which is inserted into the flowchart of FIG. 6a and which is representative of the second aspect of the present invention.

Turning now to FIG. 6b, a partial flowchart is shown which provides an alternate set of steps between block 610 and block 618, as shown. Like before, the method operates with the usual steps, as represented at 602 through 610, and then checks whether the processed value is greater than multiple fixed threshold levels beginning with a first threshold value, as represented at block 612'. If the processed value does not exceed this first fixed threshold value, then, via NO path, the method maintains full transmission parameters in the mobile radio, as represented at block 614. However if the processed value is greater than the first threshold value, then, via YES path, it checks whether the processed value exceeds a second fixed threshold value, as represented at block 630. If it does not, the method, via NO path, reduces the maximum allowable deviation only, as described at block 632. If however the processed value exceeds this second fixed threshold value, then, via YES path, the method checks to see whether the processed value exceeds a third fixed threshold value, as represented at block 634. If it does not, then, via NO path, the method reduces the maximum allowable deviation and the power output only, as given at block 636. If, however, the processed value exceeds this third fixed threshold value, then, via YES path, the method reduces the maximum allowable deviation, the power output, and the modulation filter corner, as represented at block 616. Then, the method proceeds to the transmit mode, as represented at block 618, and continues with the steps represented by block 620 (etc.) from FIG. 6a.

Although not shown in flowchart form, the process steps for a subroutine for the microcontroller in the base station are similar to the flowchart of FIG. 6a and FIG. 6b, with the exception that reception parameters, instead of transmission parameters, are controlled. The parameters include the receive audio gain and the upper frequency corner of an included deemphasis filter. The received audio gain is adjusted higher to compensate for the decreased amount of recovered audio at the base station due to the mobile radio cutting back its maximum allowable deviation, and the upper frequency corner of the deemphasis filter is changed in a manner to counteract the decrease in modulation bandwidth of the mobile, as given at step 616 depicted in FIG. 6a, and steps 632 and 616 depicted in FIG. 6b.

Turning now to FIG. 7, a detailed block diagram for a receiver in the base station is shown at 700 having an antenna 440, receiver 412, variable gain amplifier 444 which is controlled by microcontroller 448 having A/D converter 450 and D/A converter 452. Receiver 412 includes front end 702, IF stage 704, detector 706, and deemphasis filter 708 having a selectable upper corner frequency. Also coupled to IF stage 704 is received signal strength indicator 710, as shown.

Thus, the method and arrangements depicted FIG. 4, FIG. 6a, and 6b, and FIG. 7 fulfill a long-felt need to achieve adaptive splatter control in a radio communication system, particularly those in which narrower channel spacings are required at VHF or UHF channel frequencies.

In summary, the above-mentioned arrangements 400, 700, and the corresponding method 600, are able to accomplish adaptive splatter control with little sacrifice in system performance when utilized in systems with narrow channel spacings Thus, the disclosed arrangement and method is able to overcome the limitations of the known prior art.

Although the arrangement and methods of the present invention fully disclose many of the attendant advantages, it is understood that various changes and modifications not depicted herein are apparent to those skilled in the art. Therefore, even though the form of the above-described invention is merely a preferred or exemplary embodiment given with practical alternates, further variations may be made in the form, construction, and arrangement of the parts without departing from the scope of the above invention.

We claim:

1. A method for adaptively controlling the amount of splatter as received at a base station and caused by a mobile radio having a given set of transmission parameters including a maximum allowable deviation, a given amount of transmitter output power, and a modulation limiting bandwidth, the method comprising the steps of:
   sampling and storing a plurality of received signal strength values in the mobile radio related to an angle modulated signal received from the base station so as to derive a processed value from said plurality of stored values of received signal strength;
   comparing said processed value of received signal strength from the above step against at least one predetermined threshold value established for a given set of transmission parameters; and
   modifying at least one transmission parameter in the mobile radio if said processed value of received signal strength exceeds said at least one predetermined threshold value.

2. The method according to claim 1, wherein said step of sampling and storing a plurality of received signal strength values in the mobile radio related to an angle modulated signal includes sampling and storing at least once per second for a length of time limited to the duration of said received signal.

3. The method according to claim 1, wherein said step of sampling and storing a plurality of received signal strength values in the mobile radio related to an angle modulated signal includes sampling at least twice per second over at least a 5 second time interval within the duration of said received signal.

4. The method according to claim 1, wherein said step of sampling and storing a plurality of received signal strength values in the mobile radio so as to derive a processed value includes deriving an average value of received signal strength from said plurality of received signal strength values stored therein.

5. The method according to claim 1, wherein said step of sampling and storing a plurality of received signal strength values in the mobile radio so as to derive a processed value includes deriving a peak value of received signal strength from said plurality of received signal strength values stored therein.

6. The method according to claim 1, wherein said step of comparing the processed value of received signal strength includes comparing against a plurality of fixed threshold levels arranged in a step-wise increasing manner, and wherein said step of modifying at least one transmission parameter includes reducing the maximum allowable deviation in a step-wise manner corresponding to the extent that said processed value has exceeded any of said plurality of fixed threshold levels.

7. The method according to claim 6, wherein said step of reducing the maximum allowable deviation in a step-wise manner includes reducing in at least 5 steps, each step having a 0.375 dB per step reduction in the maximum allowable deviation.

8. The method according to claim 1, wherein said step of comparing the processed value of received signal strength includes comparing against one fixed threshold level, and wherein said step of modifying at least one transmission parameter includes decreasing, by a preset amount, the maximum allowable deviation, reducing the given amount of transmitter output power, and narrowing the bandwidth of an included modulation limiting filter by decreasing an upper frequency corner thereof upon exceeding said one fixed threshold level.

9. The method according to claim 1, wherein said step of comparing the processed value of received signal strength includes comparing against a plurality of progressively higher, fixed threshold levels, such as a first, a second, and a third threshold level, and wherein said step of modifying at least one transmission parameter includes:
   decreasing, by a preset amount, the maximum allowable deviation only upon exceeding said first threshold level;
   reducing the amount of transmitter output power only upon exceeding said second threshold level; and
   narrowing the bandwidth of an included modulation limiting filter by decreasing an upper frequency corner thereof only upon exceeding said third threshold level.

10. The method according to claim 1, further including the steps of:
   sampling and storing a plurality of received signal strength values in the base station related to an angle modulated signal from a mobile radio so as to derive a processed value from said plurality of stored values of received signal strength;
   comparing said processed value of received signal strength against at least one established threshold level; and
   increasing a level of audio gain in the base station upon sensing that said processed value of received signal strength received from the mobile radio exceeds said at least one established threshold level.

11. The method according to claim 10, wherein said step of comparing the processed value of received signal strength includes comparing against a plurality of established threshold levels arranged in a step-wise increasing manner, and wherein said step of increasing the level of audio gain includes increasing the level of audio gain in a step-wise manner corresponding to the extent that said processed value has exceeded any of said plurality of fixed threshold levels.

12. The method according to claim 11, wherein said step of increasing the level of audio gain in a step-wise manner includes increasing in at least 5 steps, each step having a 0.375 dB per step increase in the level of audio gain in the base station.

13. The method according to claim 1, further including the steps of:
   sampling and storing a plurality of received signal strength values in the base station related to an angle modulated signal from a mobile radio so as to derive a processed value from said plurality of stored values of received signal strength;
   comparing said processed value of received signal strength against at least a first and a second established threshold level; and
   increasing a level of audio gain in the base station upon sensing that said processed value of received signal strength received from the mobile radio exceeds said first established threshold level, and increasing a high frequency corner of a deemphasis filter within the base station upon sensing that said processed value of received signal strength exceeds said second established threshold level.

14. A system providing adaptive control of transmission parameters to reduce splatter as received at a base station and caused by an angle modulated transmitter in mobile radios operating on a limited number of channels, the system comprising:
   a plurality of mobile radio means having control means and each including:
      means for sampling and storing a plurality of received signal strength values in said mobile radio means related to an angle modulated signal from the base station so as to derive a processed value from said plurality of stored values of received signal strength;
      means for comparing said processed value of received signal strength against at least one predetermined threshold value established for a given set of transmission parameters; and
      means for modifying at least one transmission parameter in the mobile radio if said processed value of received signal strength exceeds said at least one predetermined threshold value; and
   base station means for communicating with said plurality of mobile radio means via the limited number of channels.

15. The system according to claim 14, wherein said mobile radio means includes a transceiver having at least a transmitter and receiver, and a microcontroller coupled thereto for controlling said transmitter and receiver.

16. The system according to claim 14, wherein said means for sampling and storing a plurality of received signal strength values includes a received signal strength indicator, an analog-to-digital converter, and a microcontroller.

17. The system according to claim 14, wherein said microcontroller includes a microprocessor with memory storage.

18. The system according to claim 14, wherein said means for comparing the processed value includes a comparator within an included microcontroller and having one fixed threshold level.

19. The system according to claim 18, wherein said means for modifying at least one transmission parameter includes a digital-to-analog converter; means for decreasing, by a preset amount, the maximum allowable deviation comprises a variable gain stage; means for reducing the given amount of transmitter output power comprises a transmit power control stage; and means for narrowing the bandwidth of an included modulation limiting filter comprises a switchable filter having a controllable upper frequency corner thereof.

20. The system according to claim 14, wherein said means for comparing the processed value includes a plurality of comparators within an included microcontroller and having a plurality of progressively higher fixed threshold levels, such as a first, a second, and a third threshold level 21. The system according to claim 20, wherein said means for modifying at least one transmission parameter includes:
a digital-to-analog converter;
means for decreasing, by a preset amount, the maximum allowable deviation only upon exceeding said first threshold level;
means for reducing the amount of transmitter output power only upon exceeding said second threshold level; and
means for narrowing the bandwidth of an included modulation limiting filter by decreasing an upper frequency corner thereof only upon exceeding said third threshold level.

22. The system according to claim 14, wherein said base station means includes:
a base station radio having a receiver and transmitter;
base station control means, coupled to said base station radio, including:
means for sampling and storing a plurality of received signal strength values in said base station radio elated to an angle modulated signal from a mobile radio so as to derive a processed value from said plurality of stored values of received signal strength;
means for comparing said processed value of received signal strength against at least one established threshold level; and
means for adjusting a level of audio gain in said base station radio upon sensing that a signal strength received from a mobile radio exceeds said established threshold level.

23. The system according to claim 22, wherein said means for sampling and storing and said means for comparing include a microcontroller with memory having an analog-to-digital converter and a comparator.

24. The system according to claim 22, wherein said means for adjusting a level of audio gain in the base station includes a variable gain stage, a digital-to-analog converter coupled to said variable gain stage, and a microcontroller.

25. The system according to claim 14, wherein said base station means includes:
a base station radio having a receiver and transmitter;
base station control means, coupled to said base station radio, including:
means for sampling and storing a plurality of received signal strength values in said base station radio related to an angle modulated signal from a mobile radio so as to derive a processed value from said plurality of stored values of received signal strength;
means for comparing said processed value of received signal strength against at least a first and a second established threshold level; and
means for adjusting a level of audio gain in said base station radio upon sensing that said processed value of received signal strength received from a mobile radio exceeds said first established threshold level, and means for decreasing a high frequency corner of an included preemphasis filter upon sensing that said processed value exceeds said second established threshold value.

26. The system according to claim 22, wherein said variable gain stage comprises an electrically switchable attenuator.

27. The system according to claim 22, wherein said variable gain stage comprises an amplifier having variable gain.

28. In a trunked radio communication system having a central base station and a plurality of mobile radios utilizing angle modulated signals, an improved mobile radio comprising:
controllably tuned transceiver means for communicating via any of a limited number of channels to the base station;
control means, coupled to said controllably tuned transceiver means, for automatically controlling the operation of said transceiver means, and including:
means for sampling and storing a plurality of signal strength values related to an angle modulated signal received by the mobile radio which derives a processed value from said plurality of stored values of signal strength;
means for comparing said processed value of received signal strength against at least one predetermined threshold value established for a given set of transmission parameters; and
means for modifying at least one transmission parameter in the mobile radio if said processed value of received signal strength exceeds said at least one predetermined threshold value.

29. The improved mobile radio according to claim 28, wherein said controllably tuned transceiver means comprises a receiver having a signal strength indicator and a transmitter having variable transmission parameters, including maximum allowable deviation, transmitter output power, and modulation bandwidth.

30. The improved mobile radio according to claim 28, wherein said control means comprises a microcontroller with memory.

31. The improved mobile radio according to claim 28, wherein said means for sampling and storing a plurality of signal strength values within said control means includes an analog-to-digital converter having sample and hold capability.

32. The improved mobile radio according to claim 28, wherein said means for comparing the processed value of received signal strength includes means for comparing against a plurality of fixed threshold levels arranged in a step-wise increasing manner, and wherein said means for modifying at least one transmission parameter includes means for reducing the maximum allowable deviation in a step-wise maner corresponding to the extent that said processed value has exceeded any of said plurality of fixed threshold levels.

33. The improved mobile radio according to claim 32, wherein said means for reducing the maximum allowable deviation in a step-wise manner includes means for reducing in at least 5 steps, each step having a 0.375 dB per step reduction in the maximum allowable deviation.

34. The improved mobile radio according to claim 28, wherein said means for comparing said processed value includes at least one comparator having a fixed threshold level, and wherein said means for modifying at least one transmission parameter includes a digital-to-analog converter; a variable gain stage interposed between an included audio filter limiter stage and an included FM transmitter; a transmit power control stage; and a switchable filter within said included audio filter limiter stage.

35. The improved mobile radio according to claim 28, wherein said means for comparing said processed value includes a plurality of comparators within an included microcontroller and having a plurality of progressively higher fixed threshold levels, such as a first, a second, and a third threshold level, and wherein said means for modifying at least one transmission parameter includes:
a digital-to-analog converter;
means for decreasing, by a preset amount, the maximum allowable deviation carrier only upon exceeding said first threshold level;
means for reducing the amount of transmitter output power only upon exceeding said second threshold level; and
means for narrowing the bandwidth of an included modulation limiting filter by decreasing an upper frequency corner thereof only upon exceeding said third threshold level.

36. The improved mobile radio according to claim 28, wherein said means for modifying at least one transmission parameter includes means for decreasing, by a preset amount, the maximum allowable deviation resulting from angle modulating an RF carrier.

37. The improved mobile radio according to claim 36, wherein said means for modifying at least one transmission parameter includes a digital-to-analog converter and a variable gain stage interposed between an included audio filter limiter stage and an included FM transmitter.

38. In a trunked radio communications system having a plurality of mobile radios and a base station utilizing angle modulated signals, an improved base station comprising:
means for sampling and storing a plurality of signal strength values in said base station related to an angle modulated signal from a mobile radio so as to derive a processed value from said plurality of stored values of received signal strength;
means for comparing said processed value of received signal strength against at least one established threshold value; and
means for adjusting a level of audio gain in the base station radio upon sensing that a signal strength received from a mobile radio exceeds said at least one established threshold level.

39. The improved base station according to claim 38 further comprising means for increasing a high frequency corner of an included deemphasis filter upon sensing that said processed value of received signal strength exceeds a second established threshold level.

40. A mobile radio having adaptive splatter control, comprising in combination:
receiving means for receiving a radio signal;
transmitting means for transmitting a radio signal;
means for sampling and storing a plurality of signal strength values related to a received signal from said receiving means so as to derive a processed value from said plurality of stored signal strength values;
means for comparing a processed value of received signal strength against at least one predetermined threshold value; and means for modifying at least one transmission parameter in the mobile radio if said processed value of received signal strength exceeds said at least one predetermined threshold value.

41. The mobile radio according to claim 40, wherein said at least one predetermined threshold value comprises a level above receiver sensitivity approximately equal to a nominal amount of splatter protection provided by the mobile radio, such as 55 dB.

42. A method for adaptively controlling the amount of splatter as received at a base station and caused by a mobile radio having a given set of transmission parameters, the method comprising the steps of:
sampling received signal strength in the mobile radio related to a signal received from the base station; and
modifying at least one of said transmission parameters in the mobile radio in response to said received signal strength.

43. The method according to claim 42, wherein said step of sampling received signal strength includes deriving a processed value therefrom.

44. The method according to claim 42, wherein said step of sampling received signal strength includes comparing the received signal strength against at least one predetermined threshold value established for a given set of transmission parameters.

45. A method for adaptively controlling the amount of splatter as received at a base station and caused by a mobile radio having a given set of transmission parameters, the method comprising the steps of:
sampling received signal strength in the mobile radio related to a signal received from the base station so as to derive a processed value from said received signal strength;
comparing said processed value of received signal strength from the above step against at least one predetermined threshold value established for a given set of transmission parameters; and
modifying at least one of said transmission parameters in the mobile radio in response to said received signal strength comparison.

46. A mobile radio havign adaptive splatter control, comprising in combination:
receiving means for receiving a radio signal;
transmitting means for transmitting a radio signal;
means for sampling signal strength related to a received signal from said receiving means; and
means for modifying at least one of said transmission parameters in the mobile radio in response to said received signal strength.

47. A method for adaptively controlling the amount of splatter as received at a base station and caused by a mobile radio having a given set of transmission parameters, the method comprising the steps of:
sampling, within the mobile radio, a received signal strength caused by a transmission from the base station; and
modifying, within the mobile radio, at least two of said transmission parameters in the mobile radio in response to said received signal strength.

48. The method according to claim 47, wherein said step of sampling received signal strength includes deriving a processed value therefrom.

49. The method according to claim 47, wherein said step of sampling received signal strength includes comparing the received signal strength against at least one predetermined threshold value established for a given set of transmission parameters.

50. A method for adaptively controlling the amount of splatter as received at a base station and caused by a mobile radio having a given set of transmission parameters, the method comprising the steps of:
- sampling received signal strength in the mobile radio related to a signal received from the base station so as to derive a processed value from said received signal strength;
- comparing said processed value of received signal strength from the above step against at least one predetermined threshold value established for a given set of transmission parameters; and
- modifying at least two of said transmission parameters in the mobile radio in response to said received signal strength comparison.

51. A mobile radio having adaptive splatter control, comprising in combination:
- receiving means for receiving a radio signal;
- transmitting means for transmitting a radio signal;
- means for sampling signal strength related to a received signal from said receiving means; and
- means for modifying at least two of said transmission parameters in the mobile radio in response to said received signal strength.

* * * * *